H. C. LLOYD.
Alcohol Still.
No. 80,192.
Patented July 21, 1868.
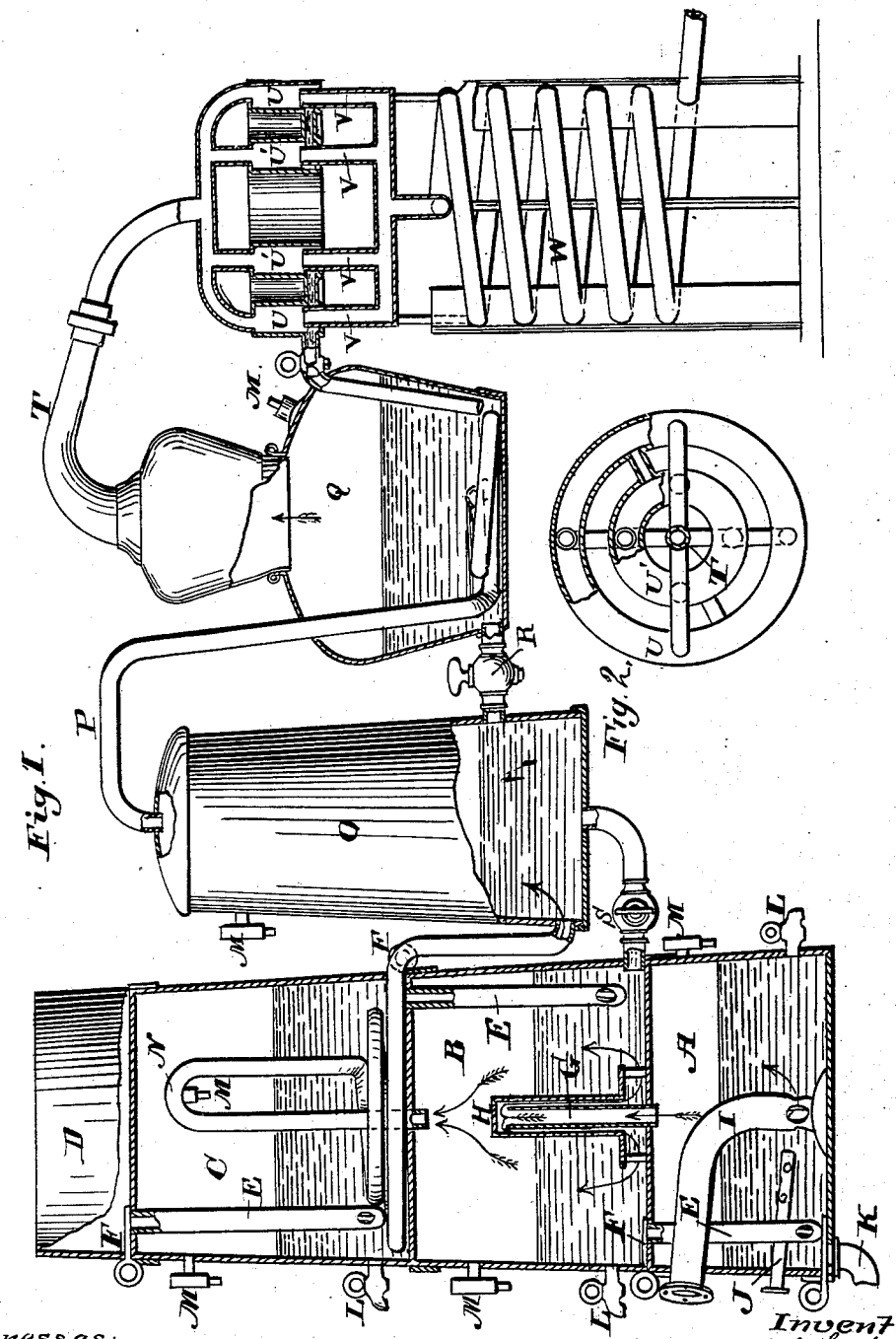

United States Patent Office.

HENRY C. LLOYD, OF CINCINNATI, OHIO.

Letters Patent No. 80,192, dated July 21, 1868.

IMPROVEMENT IN STILLS.

The Schedule referred to in these Letters Patent and making part of the same.

TO ALL WHOM IT MAY CONCERN:

Be it known that I, HENRY C. LLOYD, of Cincinnati, county of Hamilton, State of Ohio, have invented a new and useful Improvement in Stills; and do hereby declare the following to be a full, clear, and exact description thereof, reference being had to the accompanying drawings, making part of this specification.

This invention has for its object the continuous distillation of alcohol without loss of heat or of spirit, and which entirely dispenses with the use of vats, pumps, &c., for collection of low-wines and singlings.

Figure 1 is a vertical section of a distilling-apparatus, embodying my improvements.

Figure 2 is a top view of the first condenser.

My main still consists of a stack, or series of heating-chambers or boilers, A, B, and C, placed vertically one over the other, and surmounted by a tank or reservoir, D, for the beer or wort of the chambers D, C, B, and A. Each communicates with that below it by means of a pipe, E, which, descending from the bottom of the chamber nearly to the bottom of the one below, and being guarded by a valve, F, enables the attendant to discharge either all or part of the contents of the chamber above into the one below it.

The bottom chamber A communicates at the top with the bottom of chamber B by means of a compound tube or stand-pipes, G and H, through whose central pipe G the vapor from the first ascends, and within which its more watery particles, being condensed, return to the chamber A. The more volatile or spirituous portions of the vapor escaping at the top of the pipe G, descend the annular space between the two pipes G and H, and in so doing, part with a portion of their latent heat to the liquor within the chamber B, which liquor is still further heated by the ascent of the vapor through it.

Entering the side of the chamber A near its top, and bent downwards so as to discharge near its bottom, is a pipe, I, which conveys exhaust-steam from the engine, of which there are one or more in all distilleries. Also, entering the said chamber A, and discharging near its bottom, is a smaller pipe, J, which, being in communication with the boiler, is employed to project "live" steam into said chamber for starting the still.

K is a cock, employed to discharge the slop or spent liquor from chamber A.

L are try-cocks, by which to ascertain the repletion or depletion of either chamber.

M are customary vacuum-valves to prevent collapse of the chambers by too sudden condensation.

M' is a safety-valve to prevent explosion of the chamber C.

From the top of chamber B the vapor escapes through a pipe, N, which, first rising nearly to the top of chamber C, so as to at once heat the contents of said chamber, and to condense its own more aqueous portions, descends, and passing once or twice around the bottom of said chamber in form of a coil, is conducted out, and enters the bottom of first doubler O, through whose liquor it passes so as to heat the same, and from whose top it passes to the pipe P, through the top and into the lower portion of the second doubler Q, around whose interior it is coiled, in the manner shown.

Fauceted pipes, R and S, enable the attendant, from time to time, to discharge the liquor of the first doubler O into the chamber A, and that of second doubler Q into first doubler O. From second doubler Q, the vapor rises through head Q' into neck or beak F, which, entering the crown of first condenser, formed of annular chambers, U and U', descends thence by conduit V into the second condenser or worm W, of ordinary construction.

A cock, X, from the bottom of the condenser U U', enters the upper part of the second doubler Q. The inlets of conduits V being somewhat above the floor of the condenser U U', and that of other cock X at its extreme bottom, the opening of said cock X operates to discharge into the second doubler all the liquor of condensation that otherwise would escape through the worm, so that the moment the attendant observes low-wines escaping from the worm he can at once detain them in the upper condenser, and throw them back into the still for redistillation, by simply opening the cock X.

Although but one set of stand-pipes is here shown, I employ and recommend as many as three in chamber B.

The operation of the above-described apparatus is as follows:

Beer or wort being poured into the reservoir D, is allowed to descend into the chambers A, B, and C, until all the liquor stands at about half their respective heights.

Both "live" and exhaust steam being then introduced through the pipes until all of the liquor is heated to or near boiling-point, the pipe I is closed, and the pipe J remaining open, the operation proceeds in the manner already indicated, by opening from time to time the cock X, and as the liquor accumulates by condensation in the doublers O and Q, it is allowed to return by opening the fauceted pipes R and S.

At proper intervals, the liquor in the chamber A is discharged as slop or waste, through cock K, and this is immediately followed by dropping a sufficient volume of liquor from each chamber into that next below it.

Should any chamber become too much depleted of liquor, its level can be instantly restored by introducing liquor from the chamber above.

I claim herein as new, and of my invention—

1. The arrangement of chambered still A, B, C, and D, doublers O and Q, condensers U U', and vapor-pipes N, P, H, and E, substantially as and for the purpose set forth.

2. The condenser U U', or its equivalent, having the discharge-cock X into the doubler below the inlets of the escape-pipe V, as and for the purpose explained.

3. The provision of exhaust and live-steam injection-pipes I and J in the lowest chamber of series A, B, C, and D, with their described or equivalent accessories, as set forth.

In testimony of which invention, I hereunto set my hand.

HENRY C. LLOYD.

Witnesses:
 GEO. H. KNIGHT,
 JAMES H. LAYMAN.